US009981790B1

(12) United States Patent
Ost et al.

(10) Patent No.: US 9,981,790 B1
(45) Date of Patent: May 29, 2018

(54) CONTAINER LID WITH ELECTRONIC SENSORS SYSTEM

(71) Applicants: Isaac Ost, Scottsdale, AZ (US); Maher Pedersoli, Tucson, AZ (US)

(72) Inventors: Isaac Ost, Scottsdale, AZ (US); Maher Pedersoli, Tucson, AZ (US)

( * ) Notice: Subject to any disclaimer, the term of this patent is extended or adjusted under 35 U.S.C. 154(b) by 136 days.

(21) Appl. No.: 14/953,339

(22) Filed: Nov. 28, 2015

Related U.S. Application Data

(60) Provisional application No. 62/175,378, filed on Jun. 14, 2015, provisional application No. 62/085,536, filed on Nov. 29, 2014.

(51) Int. Cl.
| | |
|---|---|
| *G01G 19/52* | (2006.01) |
| *G01G 23/18* | (2006.01) |
| *B65D 41/04* | (2006.01) |
| *B65D 51/24* | (2006.01) |

(52) U.S. Cl.
CPC .......... *B65D 51/245* (2013.01); *B65D 41/04* (2013.01); *B65D 51/248* (2013.01); *G01G 19/52* (2013.01); *G01G 23/18* (2013.01)

(58) Field of Classification Search
CPC ........ G01G 19/52; G01G 19/54; G01G 19/56; G01G 19/58; G01G 19/60; G01G 23/18; B65D 51/245; B65D 41/04; B65D 51/248
See application file for complete search history.

(56) References Cited

U.S. PATENT DOCUMENTS

| | | | | |
|---|---|---|---|---|
| 4,723,669 A * | 2/1988 | Barriac | ............. | B65D 47/0838 |
| | | | | 215/206 |
| 4,939,705 A * | 7/1990 | Hamilton | ............. | A61J 7/0436 |
| | | | | 221/2 |
| 5,014,798 A * | 5/1991 | Glynn | ............. | A61J 7/0436 |
| | | | | 177/132 |
| 5,774,865 A * | 6/1998 | Glynn | ............. | G01G 19/414 |
| | | | | 177/25.19 |
| 5,950,632 A * | 9/1999 | Reber | ............. | H04L 29/06 |
| | | | | 128/898 |
| 6,294,999 B1 * | 9/2001 | Yarin | ............. | A61J 7/0481 |
| | | | | 340/573.1 |
| 7,801,745 B2 * | 9/2010 | Walker | ............. | G06F 19/3462 |
| | | | | 221/125 |
| 8,330,057 B2 | 12/2012 | Sharawi et al. | | |
| 8,502,692 B2 * | 8/2013 | Johnson | ............. | G08B 21/24 |
| | | | | 340/309.16 |
| 8,636,516 B2 | 1/2014 | Batsikouras | | |
| 8,944,249 B1 * | 2/2015 | Mullaney | ............. | B65F 1/14 |
| | | | | 177/144 |
| 2010/0089152 A1 | 4/2010 | Kolada et al. | | |
| 2010/0164716 A1 * | 7/2010 | Estevez | ............. | G06F 19/3462 |
| | | | | 340/540 |
| 2016/0324726 A1 * | 11/2016 | Roberts | ............. | A61J 7/02 |
| 2016/0327427 A1 * | 11/2016 | Briones | ............. | A61J 7/02 |
| 2016/0356640 A1 * | 12/2016 | Freeman | ............. | G01G 19/52 |

* cited by examiner

*Primary Examiner* — Randy Gibson
(74) *Attorney, Agent, or Firm* — Kang S. Lim

(57) ABSTRACT

A lid system for containers wherein the lid component features sensors for determining the amount of material stored in a particular container. The lid component of the system may be used as a lid at the top of the container or as a base at the bottom of the container. The lid features electronic modules that allow communication with smart devices.

18 Claims, 19 Drawing Sheets

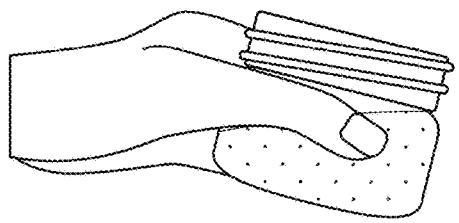
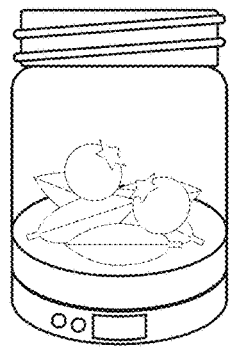
FIG. 16

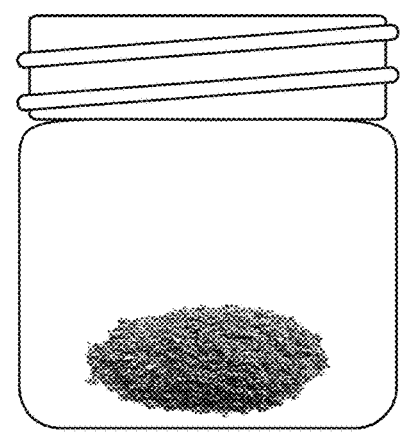
FIG. 18

CONTAINER LID WITH ELECTRONIC SENSORS SYSTEM

CROSS REFERENCE

This application claims priority to U.S. Provisional Patent Application No. 62/085,536 filed Nov. 29, 2014 and U.S. Provisional Patent Application No. 62/175,378 filed Jun. 14, 2015, the specifications of which are incorporated herein in their entirety by reference.

FIELD OF THE INVENTION

The present invention relates to measuring quantity, weight, amount, or other parameters of contents in a container (though the present invention is not limited to quantity, weight, amount and may include quality, state, and/or interactions of the contents) of any shape or size or on a lid, more particularly to lids that comprise electronic systems adapted to detect or measure parameters of contents therein (like a digital scale) or detect other parameters such as movement or temperature. The present invention is not limited to measuring parameters of the contents in the container or on the lid and may include measuring the quality, state, and/or interactions with container and the lid as well as just the lid by itself. For example, the present invention may be adapted to determine when the lid is removed from the container, when the container is touched, when the container is in a cold environment, etc. The present invention may also measure things related to the quality/state of the container, lid, or contents, e.g., temperature, humidity, light levels, orientation, location, etc.

BACKGROUND OF THE INVENTION

The present invention features a container lid system with a lid component (and optionally a container), wherein the lid component (Smart Lid) of the system comprises sensors adapted to measure the amount or weight or quantity of the contents therein. The present invention is not limited to quantity, weight, amount; the lid component may be adapted to measure other parameters such as quality, state, and/or interactions of the contents. The present invention is not limited to measuring parameters of the contents in the container or on the lid component; the present invention also features measuring the quality, state, and/or interactions with container and the lid, as well as measuring quality, state, and/or interactions of just the lid component by itself. For example, the present invention may be adapted to determine when the lid component is removed from the container, when the container is touched, when the container is in a cold environment, etc. The present invention may also measure things related to the quality/state of the container, lid component, or contents, e.g., temperature, humidity, light levels, orientation, location, etc.

The lid component (Smart Lid) of the present invention may be universal so as to be used with various types and/or sizes of containers.

The lid component (Smart Lid) is equipped with one or more electronic sensors coupled to one or more electronic modules, an operating system, and one or more communication modules. The communication module of the lid component (Smart Lid) may be configured to communicate with mobile devices or computers, e.g., via a network or wireless connections system. For example, users may create one or more mobile applications, such as a smart phone application, that will work with one or more containers equipped with the lid component (Smart Lid). Each lid component (Smart Lid) may have a unique identifier.

A single lid component (Smart Lid) may attach to several different containers, each with different contents and/or functions. For example, a lid container may be used for a food storage container as well as for a medicine bottle, fitness supplement container, liquid container, etc. The containers used with the lid component (Smart Lid) are not limited to consumable or non-consumable products. The containers may, for example, be used for protein powder, paint powder, coffee beans, plant seed, herbs, soil, jewelry, metal coins, bugs, small animals, etc.

The lid components (Smart Lids) of the present invention may be utilized for a variety of purposes, for example (1) POS applications: e.g., similar to how various companies develop applications for POS using smartphones as a platform; container with lid component (Smart Lid) attached for real-time tracking of quantity of contents removed from container or added to container; (2) Quantity, quality, and state of contents: e.g., Fermentation, mold/mildew detection, pickling, preservation, gas detection, levels of contents, presence of materials, etc.; (3) Inventory tracking: e.g., put lid component (Smart Lid) under jar, or attach to base of custom container, when adding contents to track initial quantity; place storage container upside-down with lid component (Smart Lid) attached, to track instances of content addition, removal, or interaction; instances of content addition, removal, or interaction; (4) Leverage existing consumer containers for loyalty and CRM: e.g., Fitness supplement containers with lid components (Smart Lids) for tracking use of products. Can be used to understand patterns of consumption and determine quantity and quality of contents to help optimize mechanism for facilitating re-orders of product; can be used for any type of lid for any contents, even non-consumable contents; can also be used for rewarding and incentivizing high-frequency users, etc.; (5) Reorder and receive local offers based on use of lid component (Smart Lid): e.g., understand consumption information or interactions of contents of container to facilitate new purchases of the same or related contents; e.g., consumer is using lid component (Smart Lid) for food storage. Uses X, Y, Z ingredients at F frequency, therefore will have high chance of purchasing A, B, C ingredients at T time period. The present invention is not limited to the uses described herein.

SUMMARY OF THE INVENTION

The present invention features a lid system (100) comprising: a lid component (110) comprising a top surface (112), a side (114), and a bottom surface (118) opposite the top surface, wherein threading (160) is disposed on either an inside surface of the side (114) or an outside surface of the side (114); a first sensor (120) disposed on or near the top surface of the lid component (110), the first sensor (120) comprises a load sensor adapted to detect a weight of an object placed on either the top surface (112) of the lid component (110) or the bottom surface (118) of the lid component (110); a microprocessor (150) operatively connected to a memory component (158), the microprocessor (150) is further operatively connected to the first sensor (120); a display (140) disposed on an outer surface of the lid component (110), the display (140) is operatively connected to the microprocessor (150); and a communication module (156) comprising a transmitter and a receiver, the communication module (156) is operatively connected to the microprocessor (150); a container (210) comprising threading disposed on an outside surface or an inside surface, wherein the threading (160) of the lid component (110) is engaged with threading of the container (210); and a smart device operatively connected to the communication module (156) of the lid component (110), wherein the communication module of the lid component (110) is adapted to send and receive input and output signals to and from the smart device; wherein when a weight of material is placed on the top surface (112) or on the bottom surface (118) of the lid component (110) thereby putting a load on the first sensor, the first sensor (120) detects the load and sends a first input signal to the microprocessor (150), whereupon the microprocessor (150) calculates the weight of the material on the lid component (110), whereupon the microprocessor (150) further sends a first output command to the communication module (156) to cause the communication module (156) to send information about the weight of the material to the smart device.

In some embodiments, when the microprocessor (150) sends out the first output command to the communication module (156) the microprocessor (150) also sends out a second output command to the display (140) to display the weight of the material on the lid component (110). In some embodiments, the lid component (110) is further adapted to measure humidity level, temperature, time, location, or a combination thereof. In some embodiments, the lid component (110) further comprises an alert component (122) disposed on the lid component (110), the alert component (122) is adapted to alert a user upon activation from the microprocessor. In some embodiments, the lid component (110) further comprises a second sensor disposed on or in the lid component (110), the second sensor is adapted to detect quantity, quality, state, or interactions of the container, the contents inside the container, or a combination thereof.

The present invention also features a lid component (110) for engaging a container (210), said lid component (110) comprising a top surface (112), a side (114), and a bottom surface (118) opposite the top surface, wherein threading (160) is disposed on either an inside surface of the side (114) or an outside surface of the side (114), the threading (160) allows for attachment of the lid component (110) to a container; a first sensor (120) disposed on or near the top surface of the lid component (110), the first sensor (120) comprises a load sensor adapted to detect a weight of an object placed on either the top surface (112) of the lid component (110) or the bottom surface (118) of the lid component (110); a microprocessor (150) operatively connected to a memory component (158), the microprocessor (150) is further operatively connected to the first sensor (120); a display (140) disposed on an outer surface of the lid component (110), the display (140) is operatively connected to the microprocessor (150); and a communication module (156) comprising a transmitter and a receiver, the communication module (156) is operatively connected to the microprocessor (150); wherein when a weight of material is placed on the top surface (1120 or on the bottom surface (118) of the lid component (110) thereby putting a load on the first sensor (120), the first sensor (120) detects the load and sends a first input signal to the microprocessor (150), whereupon the microprocessor (150) calculates the weight of the material on the lid component (110), whereupon the microprocessor (150) further sends a first output command to the display (140) to cause the display (140) to show the weight of the material on the lid component (110).

In some embodiments, the lid component (110) further comprises a second sensor disposed on or in the lid component (110) adapted to measure humidity level, temperature, time, location, or a combination thereof. In some embodiments, the lid component (110) further comprises a second sensor disposed on or in the lid component (110), the second sensor is adapted to detect quantity, quality, state, or interactions of the container, the contents inside the container, or a combination thereof. In some embodiments, the lid component (110) further comprises a second sensor adapted to detect a second parameter of contents placed on the lid component (110). In some embodiments, the lid component (110) further comprises a second sensor disposed on the bottom surface (118) of the lid component (110), the second sensor is adapted to measure one or more of: humidity level, temperature, time, location, movement, quality, or quantity. In some embodiments, the lid component (110) further comprises an alert component (122) disposed on the lid component (110), the alert component (122) is adapted to alert a user upon activation from the microprocessor. In some embodiments, the lid component (110) further comprises a power button operatively connected to the microprocessor (150). In some embodiments, the lid component (110) comprises an opening to allow material to move through the lid component (110). In some embodiments, the communication module is operatively connected to a smart device, wherein the communication module of the lid component (110) is adapted to send and receive input and output signals to and from the smart device.

The present invention also features a lid system (100) comprising: a lid component (110) comprising a top surface (112), a side (114), and a bottom surface (118) opposite the top surface, wherein threading (160) is disposed on either an inside surface of the side (114) or an outside surface of the side (114); a first sensor (120) disposed on or near the top surface of the lid component (110), the first sensor (120) comprises a load sensor adapted to detect a weight of an object placed on either the top surface (112) of the lid component (110) or the bottom surface (118) of the lid component (110); a microprocessor (150) operatively connected to a memory component (158), the microprocessor (150) is further operatively connected to the first sensor (120); a display (140) disposed on an outer surface of the lid component (110), the display (140) is operatively connected to the microprocessor (150); and a communication module (156) comprising a transmitter and a receiver, the communication module (156) is operatively connected to the microprocessor (150), the lid component (110) further comprises a lid device ID (LDID); a smart device operatively connected to the communication module (156) of the lid component (110), wherein the communication module of the lid component (110) is adapted to send and receive input and output signals to and from the smart device; and an application operatively connected to or integrated into the smart device, the application communicates via the smart device and communication module (156) to detect the LDID of the lid component (110), wherein after detection of the LDID the application can manipulate the lid component (110) as desired by a user via the smart device, communication module, and microprocessor (150).

In some embodiments, the application is adapted to communicate with one or more different lid components (110). In some embodiments, the system further comprises a website platform operatively connected to the application or smart device, wherein the website platform is used to communicate with the application for financial transaction purposes. In some embodiments, the website platform is adapted to accept a user's credit card. In some embodiments, the system further comprises a website platform operatively connected to the smart device, wherein the website platform is used to design the application. In some embodiments, the LDID is a one-time ID or a permanent ID.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 16 shows how the lid component may be used when making a meal inside a mason jar (see Example 5). The lid component is placed underneath the jar so that the jar is sitting on the top surface of the lid component. Then the ingredients are added and measured.

FIG. 17 shows that in some embodiments, the load sensors are at or near the top surface (112) of the lid component (e.g., as opposed to the bottom surface) and the load sensors can still measure when things are placed on either side (top surface or bottom surface). In some embodiments, other sensors may be on the top surface (112) as well, or possibly on the bottom surface, e.g., in the case that the sensor would be used to detect parameters related to the inside of the container (e.g., the container itself, the contents therein, etc.).

FIG. 18 shows the present invention used for medical marijuana, e.g., for weighing items on the bottom surface or on the top surface. FIG. 18 also shows an example of how the present invention may allow patients to budget their use based on the dollar amount (in addition to many more functions).

DESCRIPTION OF PREFERRED EMBODIMENTS

Figure 1:
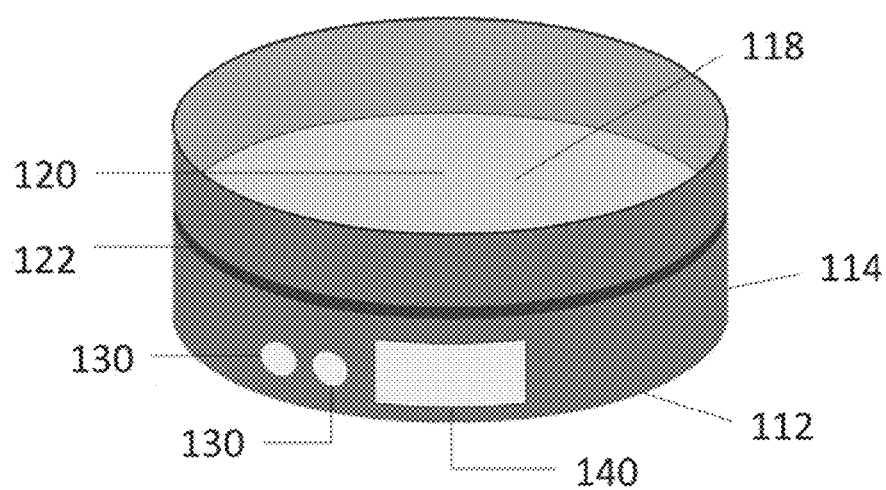
FIG. 1 shows a perspective view of the lid component of the system of the present invention.
Figure 2:
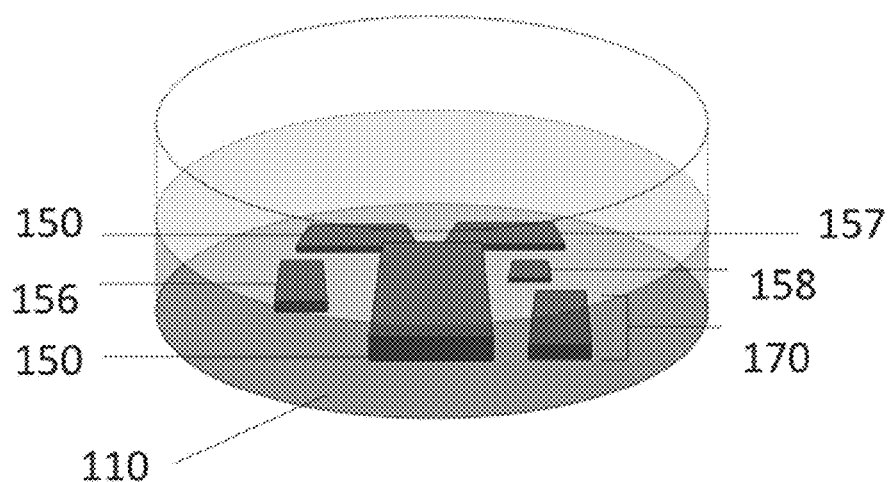
FIG. 2 shows an internal view of the lid component of FIG. 1.

Following is a list of elements corresponding to a particular element referred to herein:
100 lid system
110 lid component
112 top surface of lid component (e.g., optionally floating plate)
114 side of lid component
118 bottom surface of lid component
120 first sensor (e.g., for weighing)
122 alert component (e.g., for visual, audio, motion alerts) (Note that these components may or may not be sensors, e.g., the alert component may turn green or flash a light when the user should be using the contents in the jar depending on the time of the day.)
130 buttons
140 display
150 microprocessor
156 transmitter/receiver
157 wireless receiver
158 memory
160 threading/engagement component
170 power source
210 container (e.g., jar)
212 inside surface of container
310 converter piece
320 threaded base
310 holder component Referring now to FIG. 1-19, the present Invention features a lid component (110) that may be applied to one or a variety of containers. The lid component (110) is shaped similarly to lids of jars. Such lids of jars are well known to one or ordinary skill in the art. For example, the lid component (110) comprises a top surface (112), a side (114), and a bottom surface (118) (the surface of the lid component opposite the top surface). In some embodiments, the side of the lid component (110) extends past the bottom surface (118), creating a cavity. In some embodiments, the inside surface of the side of the lid component (110) comprises threading (160) or other appropriate engagement component that allows the lid component (110) to engage the container to which it attaches. In some embodiments, the side (114) of the lid component (110) does not extend past the bottom surface (118) and threading (160) (or other appropriate engagement component) is disposed on the side (114) (see FIG. 15) for attaching to the inside walls (212) of a container (210).

In some embodiments, the lid component (110) comprises an opening (not shown) to allow contents to enter or exit the container without the lid component (110) being removed.

The lid component (110) comprises at least a first sensor (120). Depending on the type of sensor, the sensor (120) may be placed in various particular places on or in the lid component (110). For example, in some embodiments the sensor is disposed at or near the top surface (112); in some embodiments, the sensor is disposed at or near the bottom surface (118); in some embodiments, the sensor is disposed within the lid component (110). For example, in the case of a load sensor, the load sensor may be disposed at or near the top surface (112) of the lid component (110).

Figure 17:
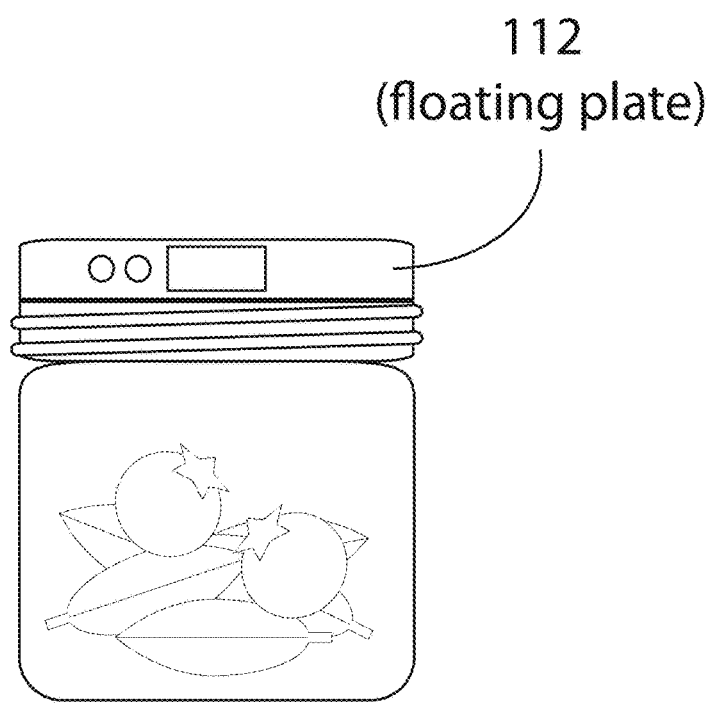
FIG. 17 shows an embodiment of the present invention. The floating plate is shown as the top surface of the lid component. The floating plate sits on top of the sensor (load sensor). This is what presses down and pushes onto the load sensor.

In some embodiments, the top surface (112) of the lid component is a floating plate (see FIG. 17). In some embodiments the top surface (112) (floating plate) sits on top of a sensor (e.g. a load sensor), and the floating plate is what presses down and pushes on the sensor (load sensor). FIG. 17 shows that in some embodiments, the load sensors are at or near the top surface (112) of the lid component (e.g., as opposed to the bottom surface) and the load sensors can still measure when things are placed on either side (top surface or bottom surface). In some embodiments, other sensors may be on the top surface (112) as well, or possibly on the bottom surface, e.g., in the case that the sensor would be used to detect parameters related to the inside of the container (e.g., the container itself, the contents therein, etc.). For example, in some embodiments, a sensor is disposed on or near the bottom surface (118) of the lid component (e.g., if the sensor is a humidity sensor, a temperature sensor, infrared light to shine into the container allowing a user to measure levels of contents therein).

In some embodiments, the lid component (110) further comprises a second sensor. In some embodiments, the lid component (110) further comprises a third sensor or four or more sensors. The sensors (120) may be adapted to sense a particular parameter, e.g., in real-time. For example, in some embodiments, the sensor detects temperature of the container, moisture inside the container, orientation of the container, quantity of items in a container, quality of items in a container, location of items in a container, the removal or addition or touching or moving of contents in the container, changes in surrounding temperature, changes in surrounding moisture, changes in light levels, changes in sound levels, etc.

In some embodiments, the sensor is a pressure sensor, a motion sensor, a temperature sensor, a location sensor, a gyroscope, a gyro meter, a pH sensor, a hygrometer, an accelerometer, a load cell, or the like. These sensors (and optionally others) may be disposed on one, two, or three of these locations: top surface, bottom surface, or within the lid component.

In some embodiments, the lid component (110) further comprises an alert component (122), e.g., for visual, audio, motion alerts. The alert component (122), may, for example, turn green or flash a light when the user should be using the contents in the jar depending on the time of the day. The present invention is not limited to this configuration or use of an alert component (122).

The lid component (110) further comprises a microprocessor (150) operatively connected to the sensors. (The microprocessor (150) is also operatively connected to a memory component (158)). The lid component (110) further comprises a power source (170) (e.g., a battery). Microprocessors, memory components, and power sources are well known to one of ordinary skill in the art. In some embodiments, the microprocessor (150) is also operatively connected to an alert component (122).

In some embodiments, the lid component (110) comprises a display (140). The display (140) may be used, for example, for displaying the information obtained by the sensor (120). In some embodiments, the lid component (110) further comprises buttons (130) for controlling functions of the sensor (120) or microprocessor or other components. For example, a button (130) may be a power button. In some embodiments, a button is a tare button. The buttons are not limited to the aforementioned functions. The display (140) is operatively connected to the microprocessor (150). The buttons (130) are operatively connected to the microprocessor (150).

In some embodiments, the lid component (110) further comprises communication module (156) comprising a transmitter and receiver. The transmitter is adapted to transmit signals to an appropriate external receiver. The receiver is adapted to accept signals from an appropriate external transmitter. The external receiver and/or external transmitter may be operatively connected to a smart phone or other smart device (e.g., interfacing with the application on the smart device).

Communication via the communication module may be via wireless receiver (157), e.g., Wi-Fi, Bluetooth, IR infrared, wired, or other wireless technology Commands from the application on the smart device are transmitted to the receiver of the lid component (110). Such commands may trigger one or more output commands from the microprocessor. The microprocessor may be triggered to send an output command to one or more of the other lid components, e.g., adding information to the memory component (158), causing the display (140) to display a particular image, number, or the like, inducing an alert in the form of a light if the lid component comprises a light, a sound if the lid component comprises a sound device, a vibration if the lid component comprises a vibrating component, etc.

Likewise, if the sensor prompts the microprocessor, the microprocessor may send an output command to the transmitter so as to send information to the smart device (e.g., the application on the smart device).

The memory and processing unit may store instructions that will be used to share with or be queried by other devices or other smart lids. The shared data communication can be triggered at scheduled times or at the occurrence of certain events. The communication can be synchronous or asynchronous, directed to one or between one or more devices or smart lids. These instructions and communications can trigger actions to be performed by either the smart lid or by other devices linked to the smart lid.

In some embodiments, the lid component (110) is adapted to receive notifications from third-party applications. These applications may allow users to create rules for events that may be sent to the lid component.

In some embodiments, the lid component (110) functions as a stand-alone device. In some embodiments, the lid component (110) is attached to a container (210). In some embodiments, the lid component (110) measures the addition or removal of contents and/or movements or interactions with the container.

In some embodiments, two or more lid components (110) may be operatively connected, e.g., can work together to share and exchange data that may trigger one or more actions taken by one or more lid components (110) or devices linked to lid components (110).

Non-limiting examples of types of containers that can be fit with a lid component (110) of the present invention include mason jars, glass, plastic, rubber, etc. jars, fitness supplement bottles, beverage containers, and any other containers storing things such as chemicals, gasses, liquids, consumable products, non-consumable products, animals and other living organisms, and any other types of contents.

In some embodiments, the lid component (110) has the ability to automatically or manually detect a unique container identifier that will allow the lid component (110) and mobile application (App) to query the type and model of a container that the lid component (110) has been attached to. In addition, this will enable the lid component (110) and mobile application to identify what contents are stored inside and what contents should be stored or not stored inside of the container, as well as any other relevant information for the container.

The lid component (110) SDK is an open platform where any individual may develop and sell mobile and non-mobile applications for the various lid component (110) sizes and models outfitted to match various sizes and models of containers.

As previously discussed, the lid component (110) may also comprise a wireless receiver (157), which may enable the lid component (110) to be able to receive commands from backend systems or from remote computers. These commands may trigger one or more alerts in the lid component (110), as to notify the user of a present parameter. These alerts may be used to notify the user when he/she has reached a certain weight of contents, or when they should remove or add a certain weight of contents to the container. In addition, the alerts may be used for much more than just signaling information about the quantity or amount in the container (e.g., things removed, added). The alerts may also alert the user to another issues, e.g., when the humidity is high, when the container fell over, when someone touches the container or opens it, when it is in an environment that is too cold, too hot, too humid, etc. For example, in some embodiments, when the lid component (110) is used as a lid, it may alert the user when he/she has put the right weight of contents on the measurement sensor. In some embodiments, when the invention is used as a holder, it may alert the user when he/she has put in or taken out enough of the contents from or in the container. The alerts can be in the form of lights and sounds, among others.

In some embodiments, the memory of the lid component (110) may also be able to store schedules of alerts. For example, the memory and wireless receiver may also be used to allow the user to set his/her own schedules, notifications or reminders, from remote computers like his/her cell phone and other devices. As previously discussed, the lid component (110) may also include a display where measurement data can be displayed.

Figure 3:
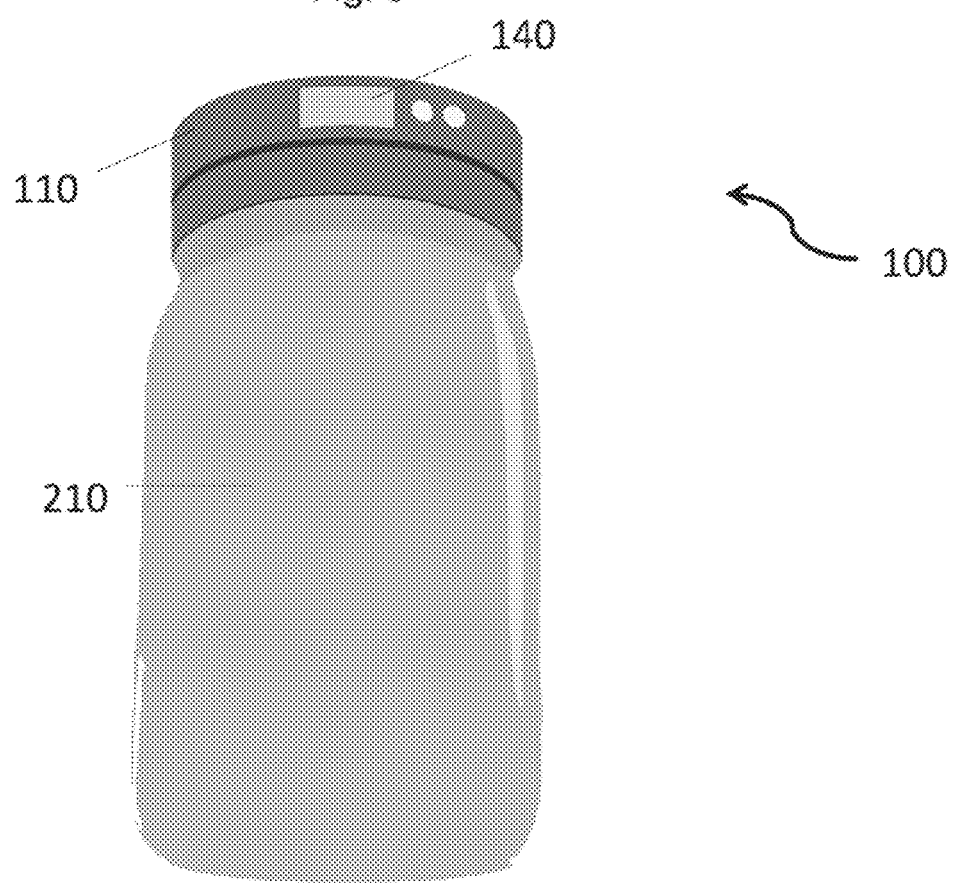
FIG. 3 shows the lid system of the present invention wherein a lid component is attached to a container.
Figure 4:
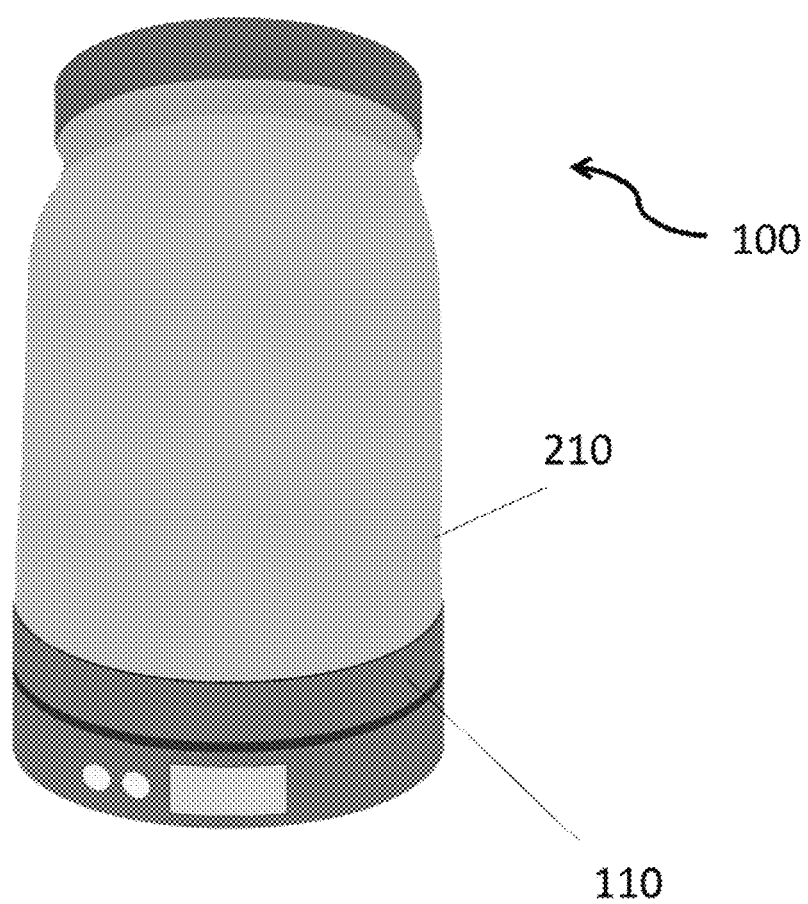
FIG. 4 shows a lid component used as a holder for a container. In some embodiments, by using it as the holder, it may be able to constantly track changes in measurements (e.g., weight) of the contents within the attached container.

Referring now to FIG. 3, the present invention features a lid system (100) that comprises the lid component (110) as described herein and a container (210). The lid component (110) comprises threading (160) (or an alternative means of engagement) disposed in its lip (114) that is adapted to engage the top portion of the container as shown in FIG. 3 or the bottom portion of the container (210) as shown in FIG. 4. As described above, the lid component (110) is adapted to sense various parameters of the contents of the container (210).

Figure 5:
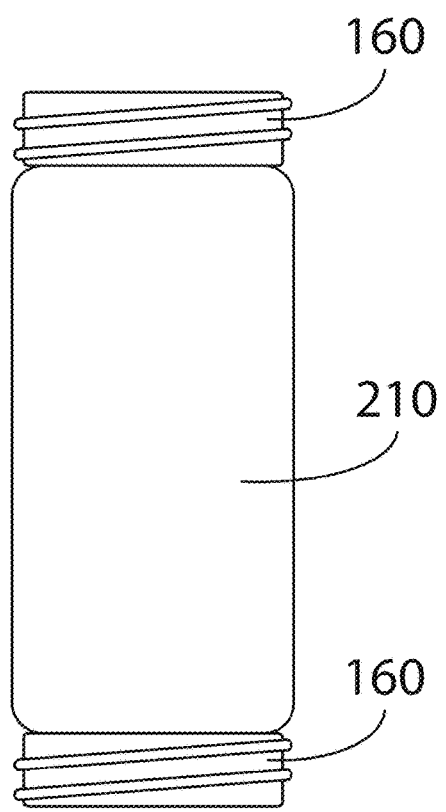
FIG. 5 shows an example of a container that has the same threads on both the top and bottom. The bottom is closed, and the top is where the opening is for the container. By having the same threads on both the bottom and top, the lid component may be screwed on to the same container as either a lid or as a holder.
Figure 6:
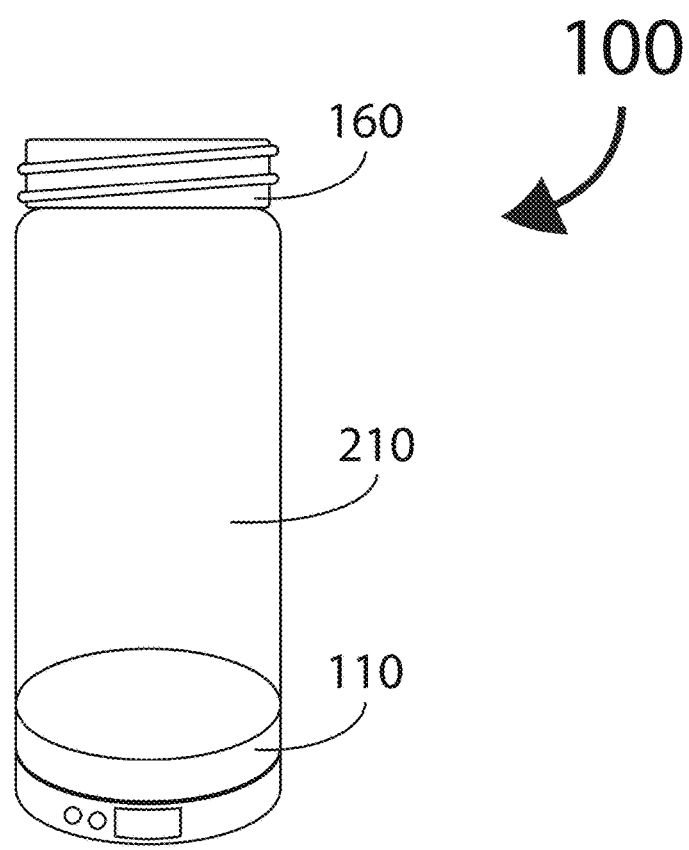
FIG. 6 shows the lid component attached to the bottom of the container of FIG. 5.

FIG. 5 shows an example of a container (210) that has two possible sites for attachment of the lid component (110): the top and the bottom. Both sites comprise threading (160) adapted to engage the threading (160) of the lid component (110). FIG. 5 shows the lid component (110) attached to the bottom of the container (210) and the lid component (110) is used to calculate the weight of contents of the container (210) (the present invention is not limited to this application). Note that in this orientation, the lid component (110) may also detect when it has been moved or picked up and/or other environmental information or interactions with the container (210) and/or contents therein.

Figure 7:
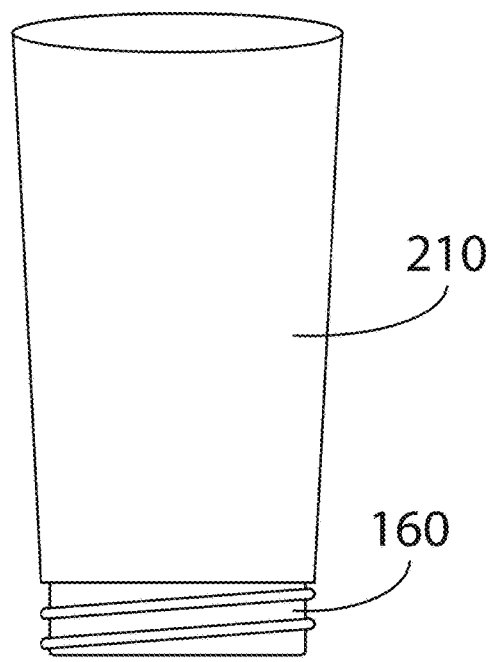
FIG. 7 shows an example of a container that has threads only on the bottom. These types of containers may allow the lid component to easily screw on to enable tracking abilities.
Figure 8:
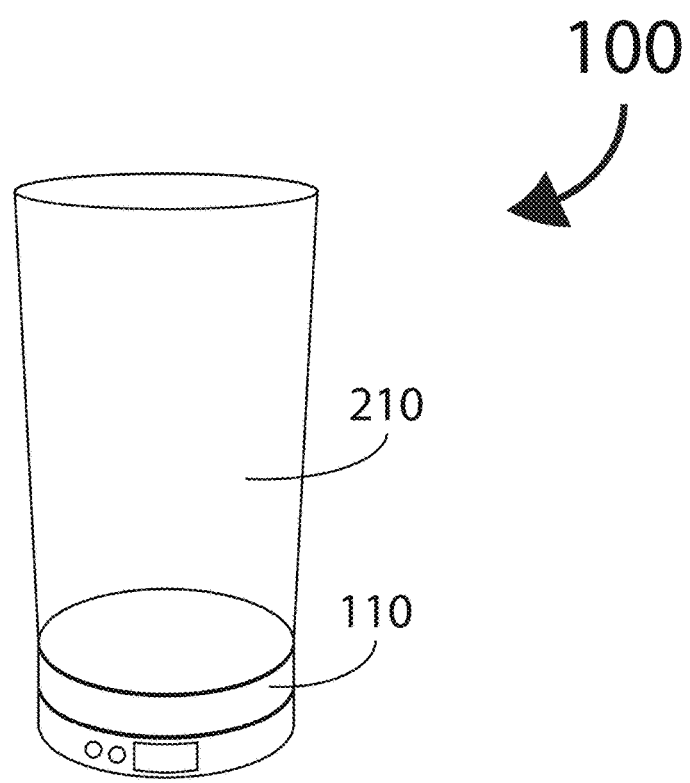
FIG. 8 shows the container of FIG. 7 wherein a lid component is screwed onto the bottom.
Figure 9:
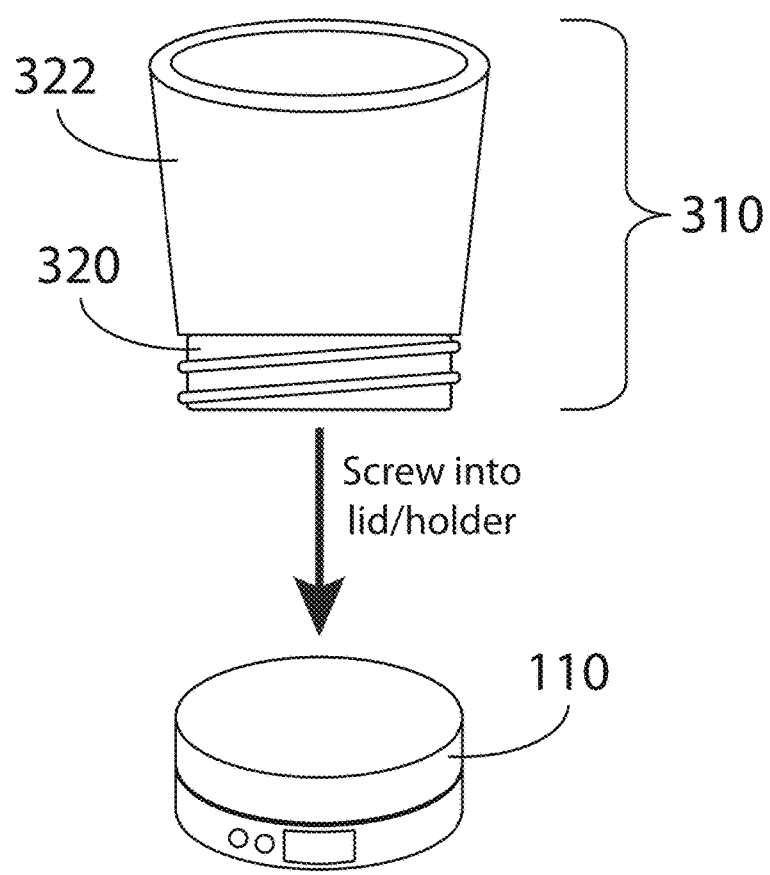
FIG. 9 shows a converter piece, which comprises a threaded base and a holder component. In some embodiments, the converter piece can be screwed into the inside of the lid component to allow containers without a threaded bottom to be used with the lid component.

FIG. 7 shows an example of a container that has one for attachment of the lid component (110): the bottom. The bottom of the container (210) comprises threading (160) adapted to engage the threading (160) of the lid component (110). FIG. 8 shows the lid component (110) attached to the bottom of the container (210) and the lid component (110) is used to calculate the weight of contents of the container (210) (the present invention is not limited to this application). Note that in this orientation, the lid component (110) may also detect when it has been moved or picked up and/or other environmental information or interactions with the container (210) and/or contents therein.

Figure 10:
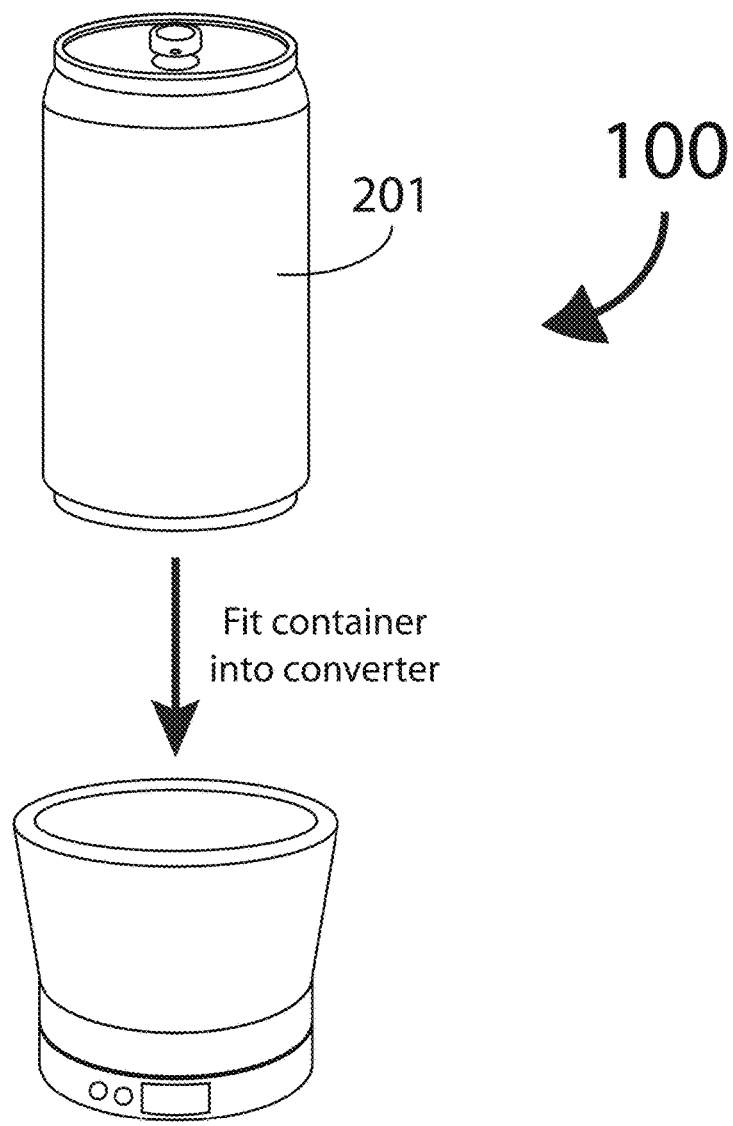
FIG. 10 shows the converter piece attached to the lid component and a container being inserted into the holder component.

The present invention also features a converter piece (310) (see FIG. 9), which allows containers without a threaded base or top area to be used with the lid component (110). For example, the converter piece (310) a threaded base (320) and a holder component (322). In some embodiments, the converter piece (310) can be screwed into the inside of the lid component (110). FIG. 10 shows the converter piece (310) attached to the lid component (110) and a container (210) being inserted into the holder component (322).

Figure 19:
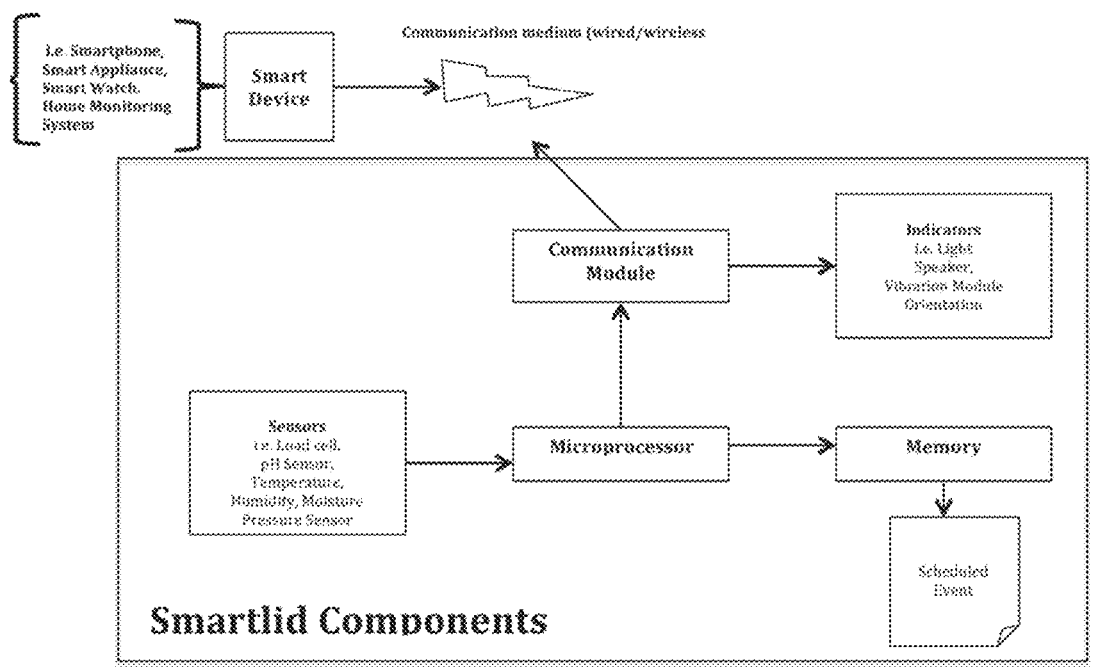
FIG. 19 shows a diagram that shows the functional process for any sensor (e.g., a load sensor, humidity sensor, light sensor, etc.).

FIG. 19 shows a diagram of the functional process of the sensors. For example, the sensors are operatively connected to the microprocessor (which is operatively connected to the memory and communication module). Also shown is the memory featuring a scheduled event (which may be used to alert a user that he/she should use the contents of the container with that particular lid component). The communication module is also operatively connected to indicators (e.g., alert components such as a light, a speaker, a vibration module, etc.). The communication module is in communication with a smart device.

Figure 11:
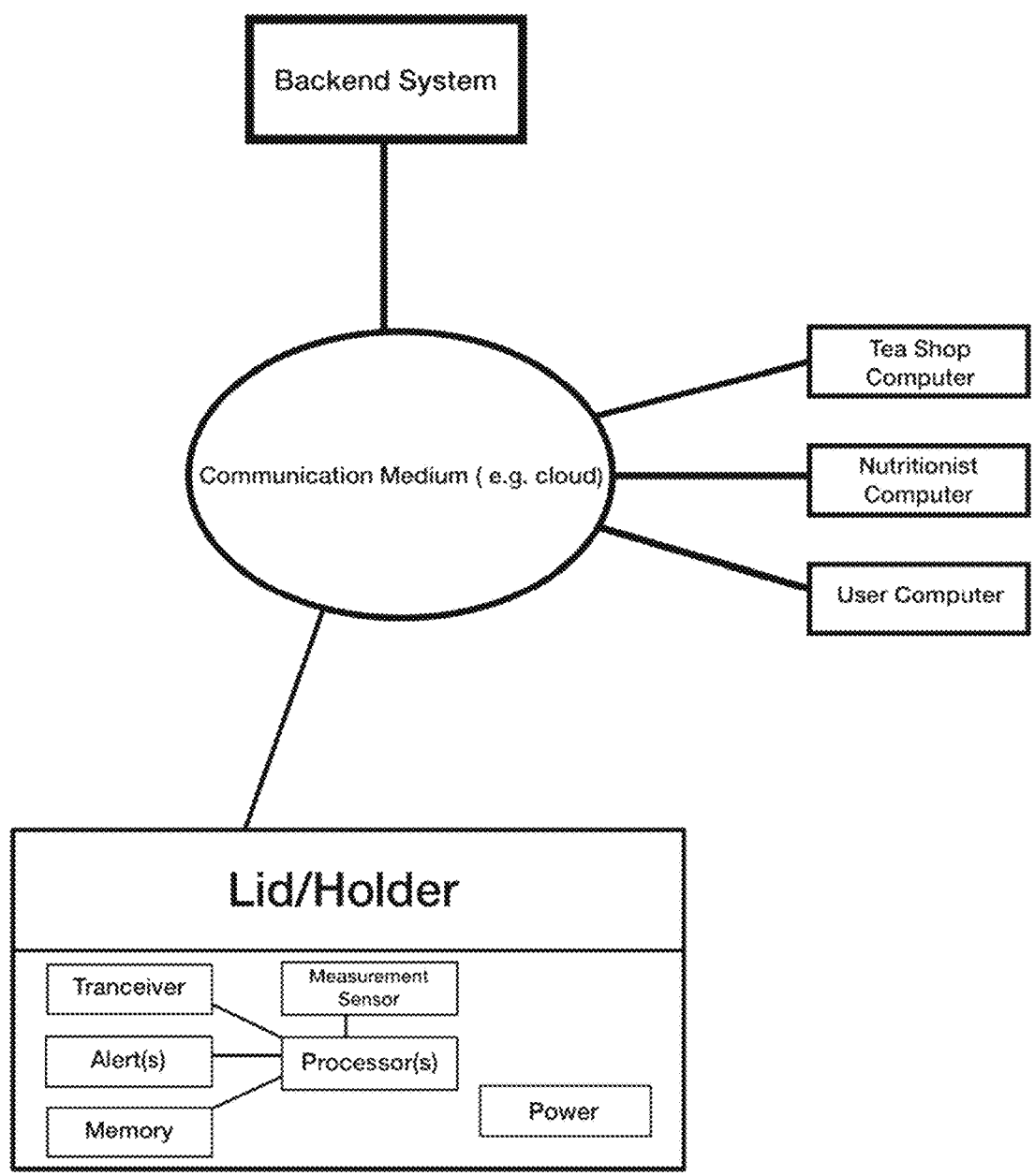
FIG. 11 is a block diagram of an illustrative system for determining the quantity/weight of contents (or other parameters as described above) and/or providing users with communication capabilities to a remote computer and/or providing alerts according to some embodiments of the present disclosure. For example, once the measurement reading is processed and communicated through the communication module, it can be linked to the shop's computer, a nutritionist's office, or a user computer like a cell phone, but not limited to these examples. The backend system can also interact and communicate throughout the system. The sensors may be placed on the inner surface or top surface (or both) when the lid component is screwed onto the container (see also description below and see also FIG. 17).
Figure 12:
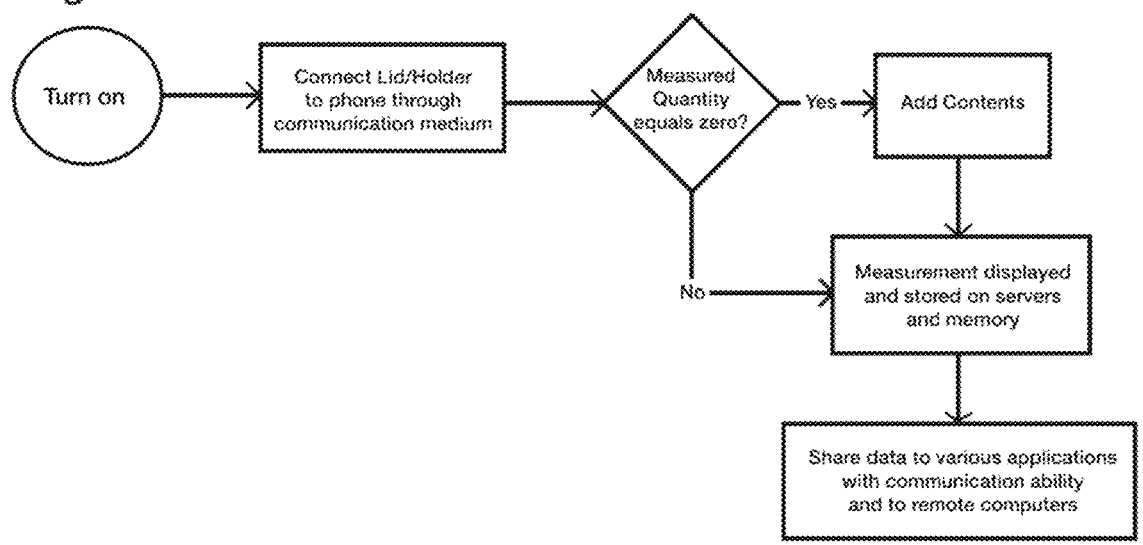
FIG. 12 is a flow diagram of the functional process of the lid/holder and how it can determine the quantity of contents and communicate and store that information.

As previously discussed, the present invention also features communication capabilities, e.g., systems for determining the quantity/weight of contents (though as previously described in the background section, the present invention is not limited to quantity/weight, see above, e.g., the present invention may be used for any information about contents, container, lid, or a combination thereof) and/or providing users with communication capabilities to a remote computer and/or providing alerts according to some embodiments of the present disclosure (see FIG. 11). For example, once the measurement reading is processed and communicated through the communication module, it can be linked to the shop's computer, a nutritionist's office, or a user computer like a cell phone, but not limited to these examples. The backend system can also interact and communicate throughout the system. FIG. 12 shows an example a process of the lid component and how it can determine the weight/quantity of contents and communicate and store that information.

Figure 13:
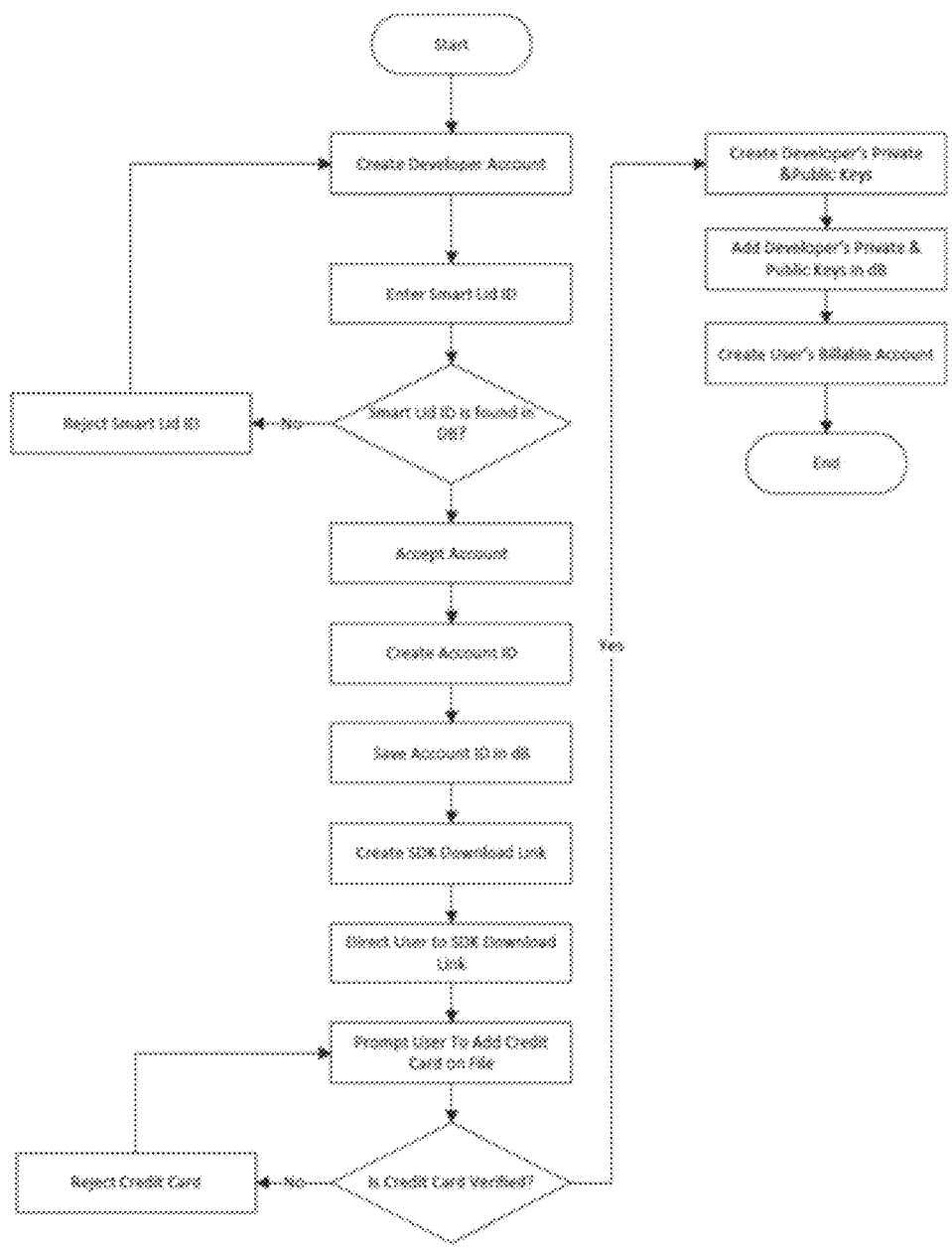
FIG. 13 shows a schematic diagram illustrating a process a developer may use to integrate the lid with a smart phone application.
Figure 14:
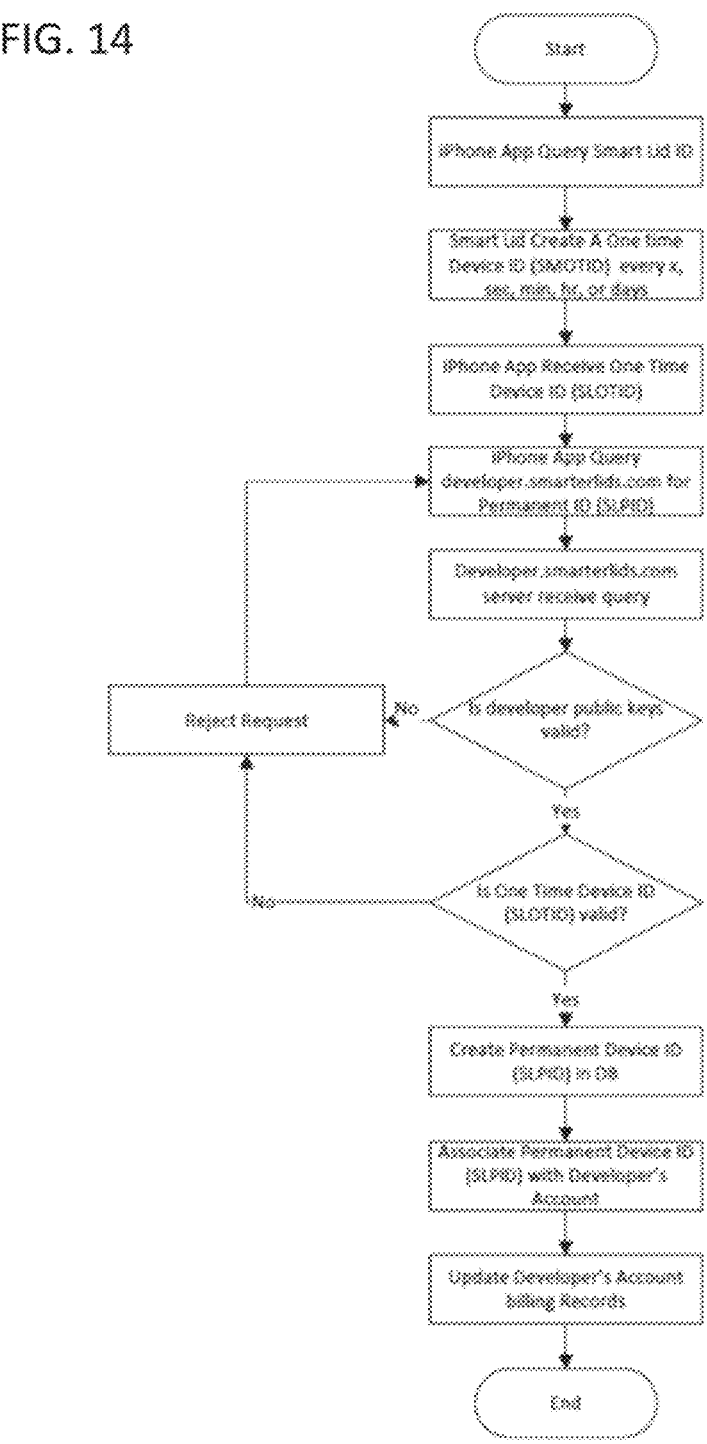
FIG. 14 shows a schematic diagram illustrating how an application may request a lid id number from a website.
Figure 15:
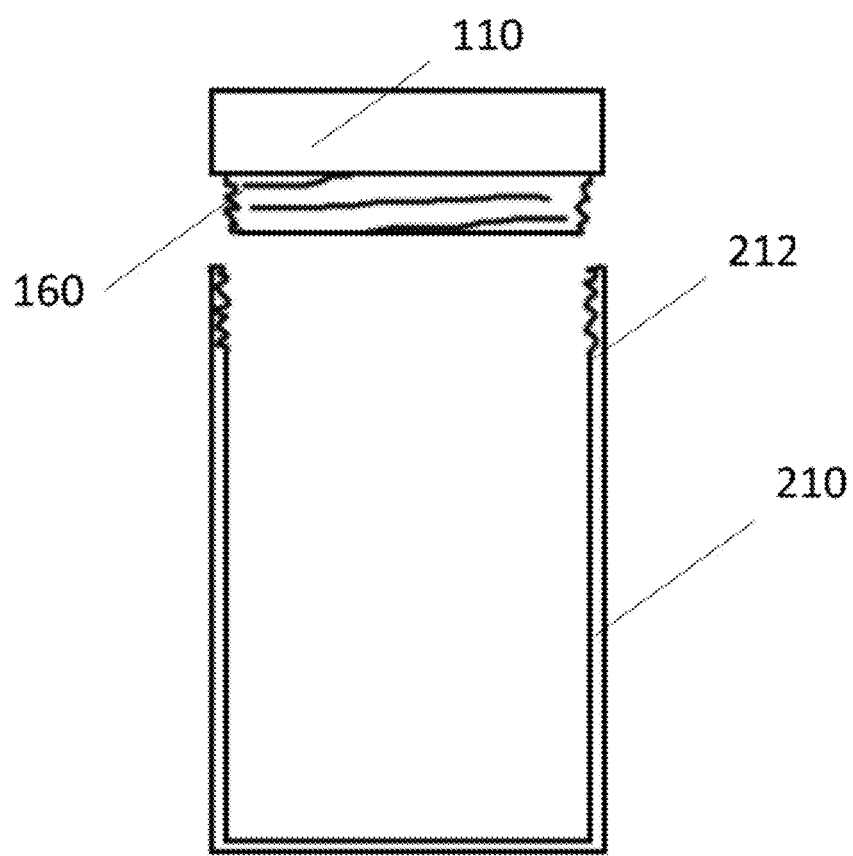
FIG. 15 shows an alternative way that the lid component may attach to a container wherein threading protrudes from the lid and goes inside of the container to attach to the container walls.

As shown in FIG. 13, a developer with a lid component (110) (Smart Lid) may create a developer's account on a particular website (e.g., http://developer.smarterlids.com). Once a developer creates his/her account and obtains the private and public keys, he/she can start developing applications on any platform, such as but not limited to iOS, Android, Windows, etc. The developer/user uses one or more lid component (110) (Smart Lid) device IDs, a user's account, and a credit card number. Briefly, the user creates a developer account and links the lid component (110) (Smart Lid) ID to the account. Once the ID is linked to the account, the user inputs the credit card information. As shown in FIG. 14, in some embodiments, an application can request a lid component (110) (Smart Lid) ID (e.g., smart lid permanent ID. SLPID) from a website (e.g., http://developer.smarterlids.com). Once a developer creates his/her account and obtains the private and public keys, he/she can start developing applications on any platform, such as but not limited to iOS, Android, Windows, etc. In some embodiments, lid components (110) (Smart Lids) are programmed to communicate a different encrypted device ID every so often, e.g., every few days. This ID is referred to as the Smart Lid One Time Device ID (SLOTDI). A mobile application such as a smart phone application can query the SLOTID using a wired or wireless communication from a lid component (110) (Smart Lid). In addition, a mobile application such as a smart phone application may need to request, using the developer's public key, lid component (110) (Smart Lid) permanent ID (SLPID) from a website (e.g., as above) in order to function in a consistent manner. In some embodiments, each time a mobile application requests a permanent ID (SLPID) of a lid component (110) (Smart Lid) it may be associated with a developer's account for billing purposes.

Example 1

A user stores almonds in a large glass jar. The lid of the jar is a lid component (110) of the present invention. The user wishes to weight out a certain amount of almonds for a snack. He removes the lid component (110) from the container (210), flips the lid component (110) over, and places it onto the table. He then pours a certain amount of almonds onto the lid component (110). The lid component (110) displays the weight of the almonds on the display (140). This allows the user to weigh out the desired amount of almonds he wishes to eat for his snack.

Example 2

A user has a water bottle equipped with a lid component (110) on its bottom. The user fills the water bottle with water. During her workout, she consumes some of the water. The lid component (110) displays the volume of the contents inside the water bottle so that the user can see how much water she has left in the water bottle.

Example 3

A teashop sells tea by weight. The tea is stored in a plastic container (210) equipped with a lid component (110) on its bottom. When a customer wishes to buy a particular weight of tea, the salesman can first read the weight of the tea in the container (210) on the display (140) of the lid component (110). As he scoops out tea from the container (210), the display shows the decreasing weight of the contents still in the container. The salesman can remove the appropriate amount of tea by viewing the display (140). The salesman may also input dollar amount for certain weights so that when he/she removes or weighs out the contents, it shows a corresponding dollar amount for either the selling price, or what he/she bought it for.

Example 4

A tea customer programs the lid component (110) on a storage bottle storing tea (the lid component (110) positioned at the bottom like a holder) appropriately to know it is storing tea inside the container to which it is attached. The lid component (110) is operatively connected to an app (connecting to various teashops). When the lid component detects that the amount of tea in the container is low, it relays that information to the app. Upon receiving this information, the app sends offers and coupons from various teashops in the area so the tea customer can decide where to buy tea to refill his/her container.

Example 5

A user has a mason jar and a lid component and wishes to determine nutritional contents of a meal she wants to make. She puts the lid under the jar and makes the meal inside the jar (see FIG. 16). As the meal is being made, the lid measures the weight of each ingredient as it is added and then calculates the calories and nutrients of the entire meal.

Example 6

By using a lid component of the present invention, a user tracks his/her food consumption for a certain period of time (generating a dataset showing a timeline of consumption and other relevant data). He brings that information to his dietician and/or doctor and/or nutritionist so that those individuals can easily view his consumption history.

Example 7

Medical marijuana patients may also use the present invention for tracking, managing, and/or budgeting their consumption (see FIG. 18). For example, a patient may be able to see a dollar amount of what he weights on the lid component. In some embodiments, the user can use a lid component that has a humidity sensor, accelerometer, etc. for the curing stage of *cannabis* production, where the humidity levels, quantity, and other quality measurements must be taken. In this process, the *cannabis* can be stored inside the jar with the entire jar flipped upside down, so that when the humidity within the container is above the set threshold, it will alert them, and then track when the jar is lifted from the surface and lid removed to let the moisture out.

Example 8

The lid component (110) is used as a nutrient tracker. When using the lid component (110), the user can select the ingredient or dry good he/she is measuring, and an application can tell the user the amount of nutrients in that measurement of it. With the lid component (110) attached, the user may also share his/her real-time tracking data with specified computers like nutritionist's computers, and other healthcare entities that would benefit off of the data around the user's consumption habits. One such example may be allowing a nutritionist to interact with the user by listing a schedule of things they should eat and the amount they should eat of it. For example, if the user has 5 holders attached to 5 containers, and stores 5 ingredients in them, the nutritionist can set a schedule to eat combinations of these ingredients in certain amounts throughout the day. This is not limited to eating or edible contents.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the dimensions of the figures do not limit the claims. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A lid system comprising:
   a lid component comprising a top surface, wherein the top surface is a floating plate, a bottom surface opposite the top surface, and a side extending down from the bottom surface wherein threading is disposed on an inside surface of the side;
   a load sensor disposed under the top surface of the lid component adapted to detect a weight of an object placed on either the top surface of the lid component;
   a container comprising threading disposed on an outside surface, wherein the threading of the lid component is engaged with threading of the container;
   a microprocessor operatively connected to a memory component, the microprocessor is further operatively connected to the load sensor;
   a display disposed on an outer surface of the lid component, the display is operatively connected to the microprocessor; and
   a communication module comprising a transmitter and a receiver, the communication module is operatively connected to the microprocessor, configured to communicate with a smart device, wherein the communication module is adapted to send and receive input and output signals to and from the smart device;
   wherein the lid system is configured such that when a weight of material is placed on the top surface of the lid component thereby putting a load on the load sensor, the load sensor detects the load and sends a first input signal to the microprocessor, whereupon the microprocessor calculates the weight of the material on the lid component, whereupon the microprocessor further sends a first output command to the communication module to cause the communication module to send information about the weight of the material to the smart device.

2. The lid system of claim 1, wherein when the microprocessor sends out the first output command to the communication module the microprocessor also sends out a second output command to a display to display the weight of the material on the lid component.

3. The lid system of claim 1, wherein the lid component is further adapted to measure humidity level and temperature, using a hydrometer and thermometer, of the external environment of the lid component.

4. The lid system of claim 1 further comprising an alert component disposed on the lid component the alert component is adapted to alert a user upon activation from the microprocessor.

5. The lid system of claim 1 further comprising an infrared sensor disposed on the bottom surface of the lid component, the infrared sensor adapted to detect a level of contents inside the container.

6. A lid component for engaging a container, said lid component comprising:
   a top surface, a bottom surface opposite the top surface, and a side extending down from the bottom surface, wherein threading is disposed on an inside surface of the side the threading allows for attachment of the lid component to a container, and wherein a diameter of the bottom surface and the side is adapted to fit a standard size of a mason jar or a fitness supplement bottle;
   a first sensor disposed under the top surface of the lid component, the first sensor comprises a load sensor adapted to detect a weight of an object placed on the top surface of the lid component;
   a microprocessor operatively connected to a memory component, the microprocessor is further operatively connected to the first sensor;
   a display disposed on an outer surface of the lid component, the display is operatively connected to the microprocessor; and
   a communication module comprising a transmitter and a receiver, the communication module is operatively connected to the microprocessor; wherein when a weight of material is placed on the top surface or on the bottom surface of the lid component thereby putting a load on the first sensor, the first sensor detects the load and sends a first input signal to the microprocessor, whereupon the microprocessor calculates the weight of the material on the lid component, whereupon the microprocessor further sends a first output command to the display to cause the display to show the weight of the material on the lid component.

7. The lid component of claim 6 further comprising a second sensor disposed on the lid component adapted to measure humidity level and temperature of the environment external to the lid component.

8. The lid component of claim 6 further comprising an infrared sensor disposed on or in the lid component, the infrared sensor adapted to detect a level of the contents inside the container.

9. The lid component of claim 6 further comprising a second sensor disposed on the bottom surface of the lid component, the second sensor is adapted to measure temperature within the container.

10. The lid component of claim 6 further comprising an alert component disposed on the lid component, the alert component is adapted to alert a user upon activation from the microprocessor.

11. The lid component of claim 6 further comprising a power button operatively connected to the microprocessor.

12. The lid component of claim 6, wherein the communication module is operatively connected to a smart device, wherein the communication module of the lid component is adapted to send and receive input and output signals to and from the smart device.

13. The lid system of claim 1, further comprising a pH sensor disposed on the bottom surface of the lid component, the pH sensor adapted to detect levels of acidity of contents inside the container.

14. The lid system of claim 1, further comprising at least one of a gyroscope and an accelerometer disposed within the lid component, the gyroscope and accelerometer adapted to detect movement of the lid component.

15. The lid system of claim 1, further comprising a hydrometer sensor disposed on the bottom surface of the lid component, the hydrometer sensor adapted to detect levels of humidity of contents inside the container.

16. The lid component of claim 6, further comprising a pH sensor disposed on the bottom surface of the lid component, the pH sensor adapted to detect levels of acidity of contents inside the container.

17. The lid component of claim 6, further comprising at least one of a gyroscope and an accelerometer disposed within the lid component, the gyroscope and accelerometer adapted to detect movement of the lid component.

18. The lid component of claim 6, further comprising a hydrometer sensor disposed on the bottom surface of the lid component, the hydrometer sensor adapted to detect levels of humidity of contents inside the container.

* * * * *